US007472625B2

(12) United States Patent
Hwa

(10) Patent No.: US 7,472,625 B2
(45) Date of Patent: Jan. 6, 2009

(54) STRUCTURE OF AUTOMOBILE PEDAL

(75) Inventor: Robin Hwa, Hsi Chih (TW)

(73) Assignee: Great Performance Industries Co., Ltd., Hsi Chih (TW)

(*) Notice: Subject to any disclaimer, the term of this patent is extended or adjusted under 35 U.S.C. 154(b) by 38 days.

(21) Appl. No.: 11/617,732

(22) Filed: Dec. 29, 2006

(65) Prior Publication Data

US 2008/0156140 A1 Jul. 3, 2008

(51) Int. Cl.
*G05G 1/48* (2008.04)
*B62J 25/00* (2006.01)

(52) U.S. Cl. ......................... 74/563; 280/291; D12/174

(58) Field of Classification Search .................. 74/563, 74/562, 594.4; 280/291; D12/174; *G05G 1/16*
See application file for complete search history.

(56) References Cited

U.S. PATENT DOCUMENTS 1,494,983 A * 5/1924 Sinclair ....................... 74/563
D372,448 S * 8/1996 Holst ........................ D12/174
5,673,597 A * 10/1997 Lin ............................ 74/563
5,913,948 A * 6/1999 Lien ........................... 74/563
5,927,155 A * 7/1999 Jackson ..................... 74/594.4
6,370,984 B1 * 4/2002 Chang ......................... 74/563
6,390,488 B1 * 5/2002 Wallingsford ............... 280/291
6,619,156 B1 * 9/2003 Super et al. ................... 74/563
6,622,592 B2 * 9/2003 Lee ............................. 74/563
2003/0024344 A1 * 2/2003 Liu ............................. 74/563

FOREIGN PATENT DOCUMENTS

DE 100 32 574 A1 * 1/2002
GB 2 064 732 A * 6/1981 .................. 74/563

* cited by examiner

*Primary Examiner*—Vinh T. Luong
(74) *Attorney, Agent, or Firm*—Leong C. Lei

(57) ABSTRACT

An automobile pedal includes a frame member, an embedded member, a base board, and a mounting structure. The frame member forms an opening. The embedded member forms a raised portion formed on a top thereof. Embossment is formed on die top of the raised portion. Also formed on the raised portion are bosses located around the embossment. The raised portion is fit in the opening of the frame member. A bottom of the embedded member is positioned on the base board and is secured thereto. The base board is also secured to the mounting structure to thereby constitute an automobile pedal, which can be used as an accelerator pedal or a brake pedal and features decoration and skid-proofness as well as replaceability of the embedded member to effect replacement of decoration patterns and to achieve protection of environment.

2 Claims, 7 Drawing Sheets

STRUCTURE OF AUTOMOBILE PEDAL

BACKGROUND OF THE INVENTION (a) Technical Field of the Invention

The present invention relates to an automobile pedal and in particular to an automobile pedal that features decoration and skid-proofness, as well as replaceable patterns and is also conservative for environment.

(b) Description of the Prior Art

A conventional automobile pedal such as an accelerator pedal, a brake pedal, and a clutch pedal, as shown in FIG. 1, comprises a body 1 having a top surface embossment 11 and a bottom secured to a mounting structure 2 constituted by a separate board. The mounting structure 2 serves to fix the pedal to the accelerator pedal or the brake pedal not only to provide decoration but also effect skid-proofness. The conventional automobile pedal is made of metal, which in fact is not good for skid-proofness and this is particularly true for a driver who wears shoes having rigid outer soles and attempts to use the rigid-sole shoes to step the pedal. In addition, since the body is made of metal, once worn out, the pedal has to be completely replaced by a new one. This causes a great consumption of natural resources for wearing often occurs in a minor portion of the pedal, and is also against environment protection for the amount of waste induced by the disposal of the worn pedal is increased. Further, for pedal with different decorative patterns, different molds are needed in making the pedals. This is itself not economic for manufacturing of the automobile pedals.

Thus, it is desired to have an automobile pedal having a structure that overcomes the drawbacks of the conventional pedals.

SUMMARY OF THE INVENTION

The primary purpose of the present invention is to provide an automobile pedal, which features, besides decoration and skid-proofness, replaceability of decorative patterns and reduction of consumption of natural resources and is helpful for environment protection.

To achieve the above object, the present invention provides an automobile pedal comprising a frame member, an embedded member, a base board, and a mounting structure. The frame member forms an opening. The embedded member forms a raised portion formed on a top side thereof. Embossment is formed on the top of the raised portion. Also formed on th-e raised portion is a plurality of bosses located around the embossment. The raised portion is fit in the opening of the frame member. A bottom of the embedded member is positioned on the base board and is secured thereto. The base board is also secured to the mounting structure to thereby constitute an automobile pedal, which can be used as an accelerator pedal or a brake pedal and features decoration and skid-proofness, as well as replaceability of the embedded member to effect replacement of decoration patterns and to achieve protection of environment.

The embedded member of the automobile pedal is made of flexible and soft material, such as rubber, to provide comfortableness of stepping and to enhance skid-proofness.

The embossment of the raised portion of the embedded member may comprise different zones that are formed by micro injection molding so that the different zones are provided with different colors to realize vivid and aesthetic appealing to general consumers.

The frame member of the automobile pedal comprises securing tabs formed on a circumferential wall thereof and extending in a direction substantially perpendicular to the frame member. A circumferential wall of the base board forms notches corresponding to and receivingly engaging the securing tabs to thereby attach the frame member to the base board with the embedded member interposed between the frame member and the base board and the raised portion of the embedded member received in the opening of the frame member.

The foregoing object and summary provide only a brief introduction to the present invention. To fully appreciate these and other objects of the present invention as well as the invention itself all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 4 and 5 are exploded view of the automobile pedals shown in

FIGS. 2 and 3, respectively;

DETAILED DESCRIPTION OF THE PREFERRED EMBODIMENTS

Figure 1:
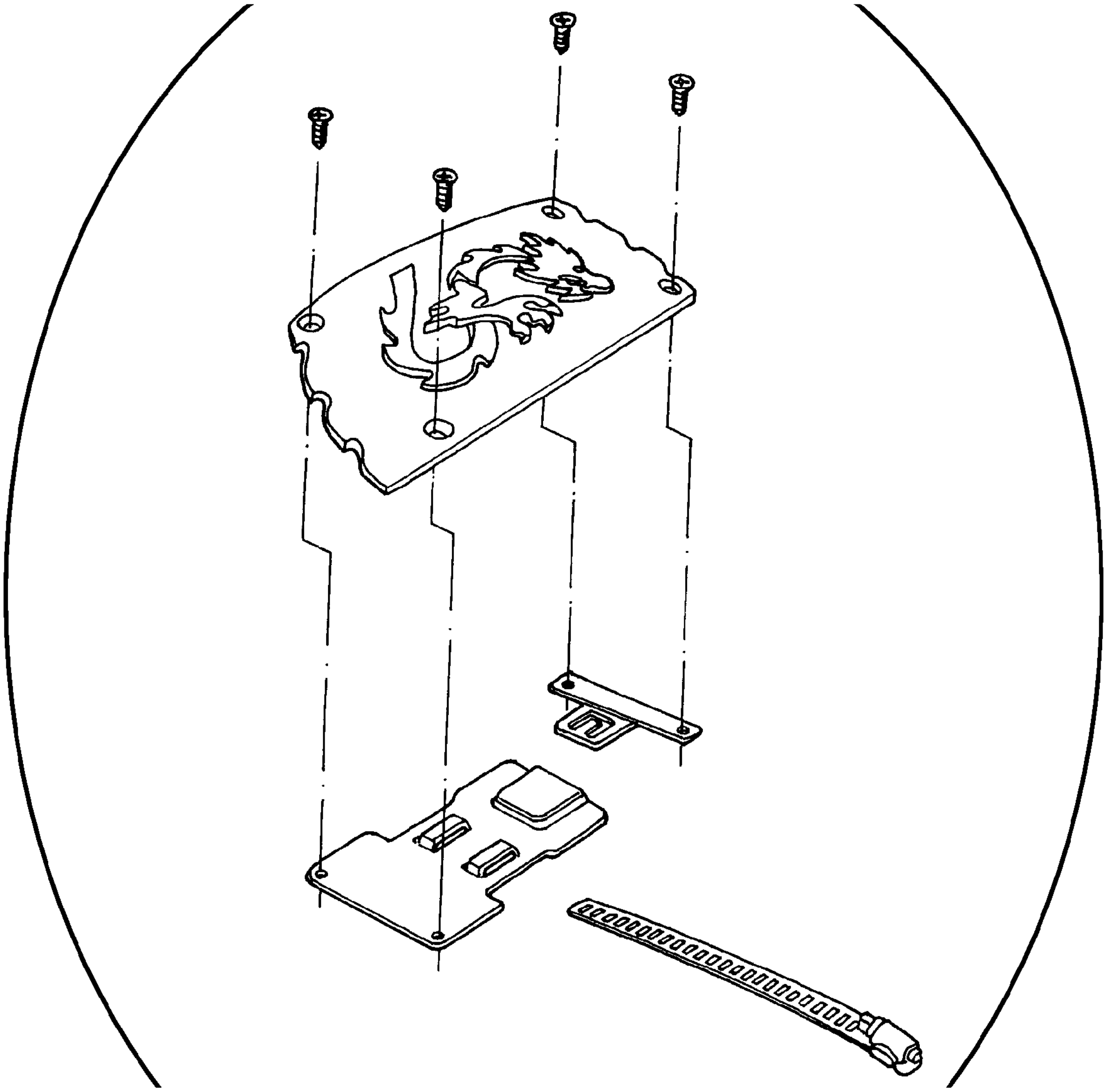
PRIOR ART FIG. 1
FIG. 1 is an exploded view of a conventional automobile pedal.
Figure 2:
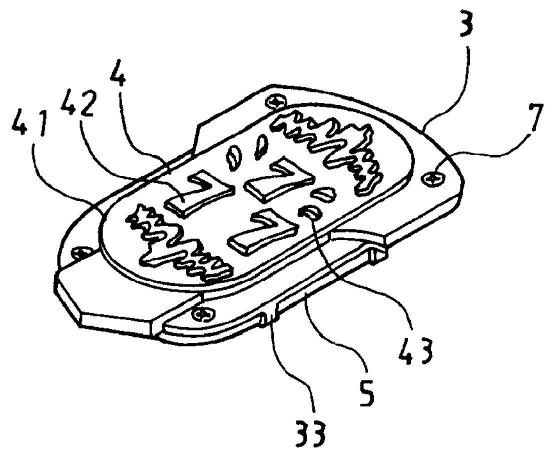
FIGS. 2 and 3 are perspective views of automobile pedals in accordance with the present invention having different configurations.
Figure 3:
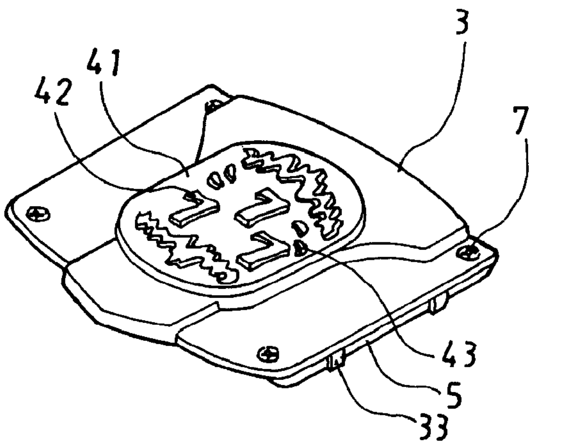
Figure 4:
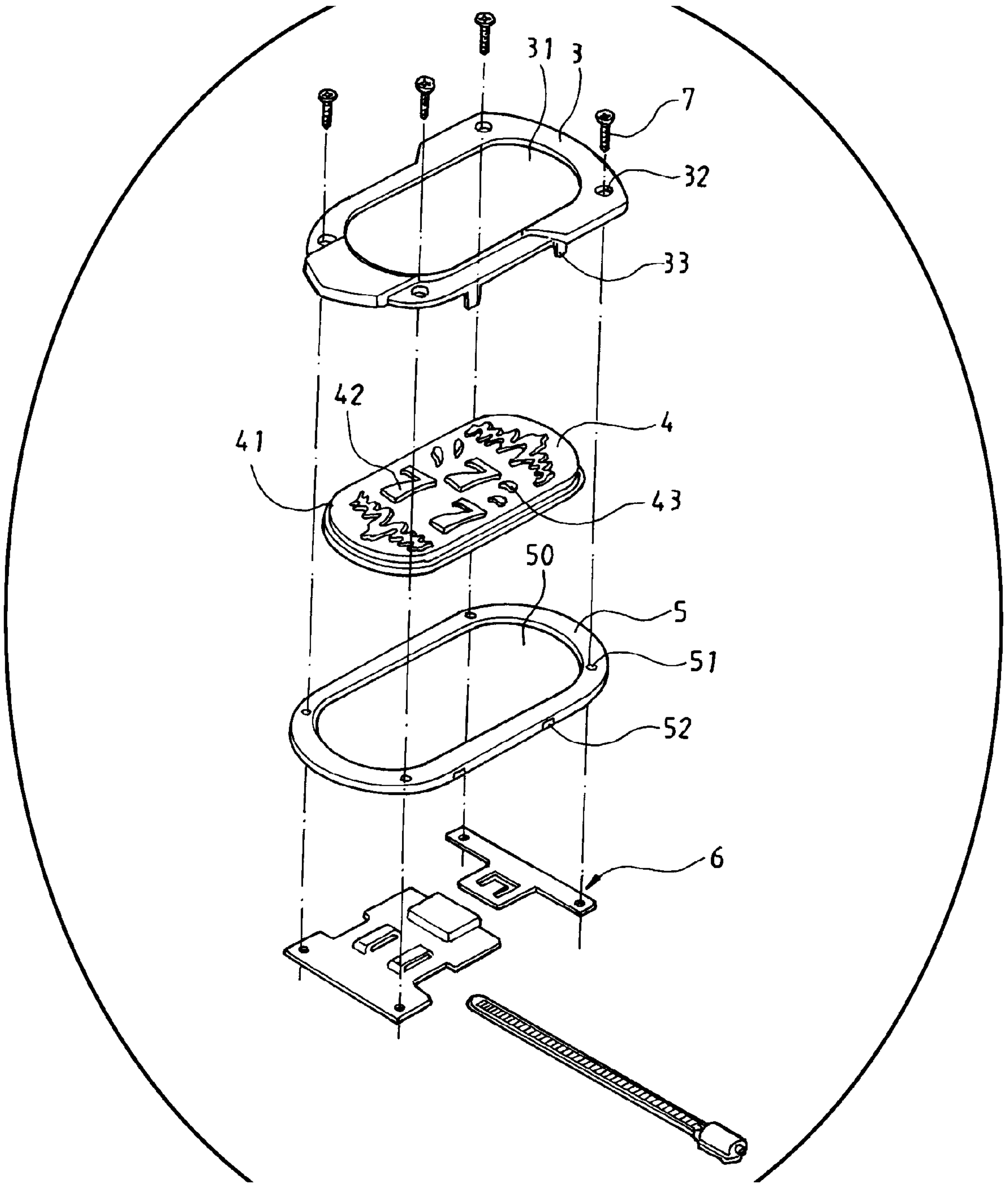
Figure 5:
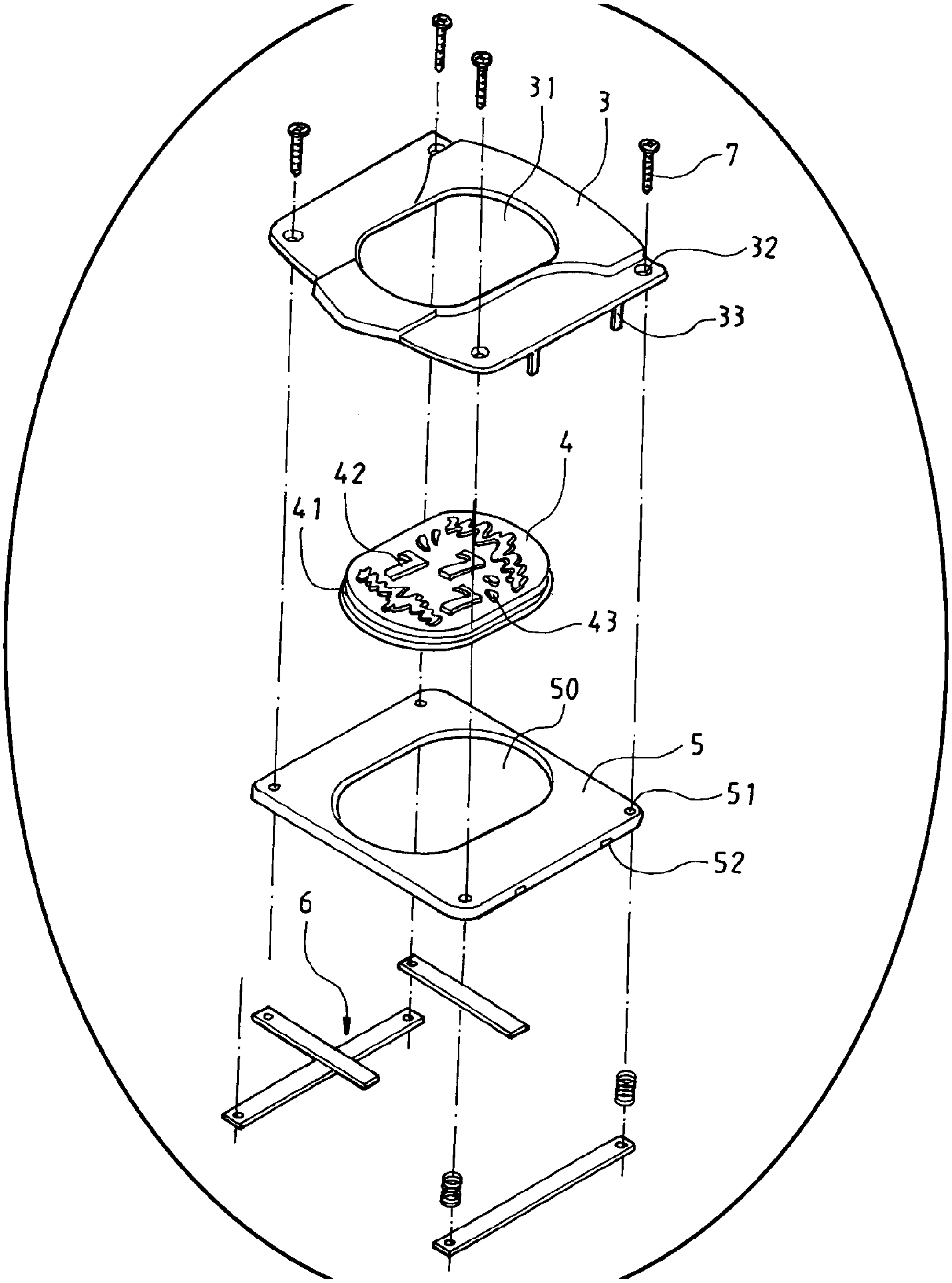

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

With reference to the drawings and in particular to FIGS. 2-5, an automobile pedal constructed in accordance with the present invention comprises a frame member 3, an embedded member 4, a base board 5, and a securing structure 6. The frame member 3 forms an opening 31 surrounded by a circumferential wall (not labeled) in which mounting holes 32 are defined. A plurality of securing tabs 33 is formed on and distributed along an outer circumference of the circumferential wall and is substantially perpendicular to the frame member 3.

The embedded member 4 is made of a flexible and soft material, such as rubber and comprises a raised top portion 41 that is complementary, in shape and size, to the opening 31 of the frame member 3. Embossed patterns 42 are formed on a top face of the raised portion 41. In the embodiment illustrated, the embossments 42 include figures and patterns, but can be of any desired shapes and sizes and arrangements. Also formed on the top face of the raised portion 41 are bosses 43 that are arranged at suitable locations around the embossed patterns 42.

The base board 5 forms, in a top face thereof, a cavity 50 substantially corresponding to the embedded member 4 and circumferential wall (not labeled) surrounding the cavity 50. Mounting holes 51 are defined in the circumferential wall. In an outer side surface of the circumferential wall of the base hoard 5, a plurality of notches 52 corresponding to the securing tabs 33 of the frame member 3 is defined.

The mounting structure 6 is of the same structure as that of the conventional automobile pedal and comprises a board that is separate from the base board 5, the embedded member 4 and the frame member 3.

The frame member 3, the embedded member 4, and the base board 5 can be of any desire shape of for example an accelerator pedal, a brake pedal, or a clutch pedal. To assemble, the embedded member 4 is fit into the cavity 50 of the base board 5 with the raised portion 41 projecting beyond the base board 5. The frame member 3 is positioned on the base board 5 with the raised portion 41 of the embedded member 4 received in the opening 31 of the frame member 3. The securing tabs 33 are inward bent and deformed to engage the corresponding notches 52 of the base board 5 so as to temporarily attach the frame member 3 to the base board 5 with the embedded member 4 sandwiched therebetween. The assembly of the frame member 3, the embedded member 4, and the base board 5 is then positioned on the mounting structure 6 and secure thereto by bolts or screws 7 extending through the mounting holes 32, 51 of the frame member 3 and the base board 5 to engage corresponding holes (not labeled) defined in the mounting structure 6 to secure the assembly of the frame member 3, the embedded member 4, and the base board 5 to the mounting structure 6. The mounting structure 6 may then be attached to for example an accelerator pedal or a brake pedal of an automobile to effect skid-proofness and decoration. Due to removability of the embedded member 4 from the assembly of the frame member 3, the embedded member 4, and the base board 5 by releasing the bolts and disengaging the frame member 3 from the base board 5, the embedded member 4 can be replaced as desired to realize change of the decoration patterns of the pedal and for conversation of environment by reducing consumption of natural resources.

As mentioned above, the embedded member 4 is made of flexible and soft material and forms a plurality of bosses 43. Thus, comfortableness of stepping the pedal can be ensured and skid-proofness can be enhanced. This is of particular effect when a user wearing shoes having rigid outer soles attempts to step the pedal. In addition, the embossed patterns 42 can be formed by micro injection molding so that different zones can be of different colors to enhance aesthetic and vivid appealing to the general consumers.

Figure 6:
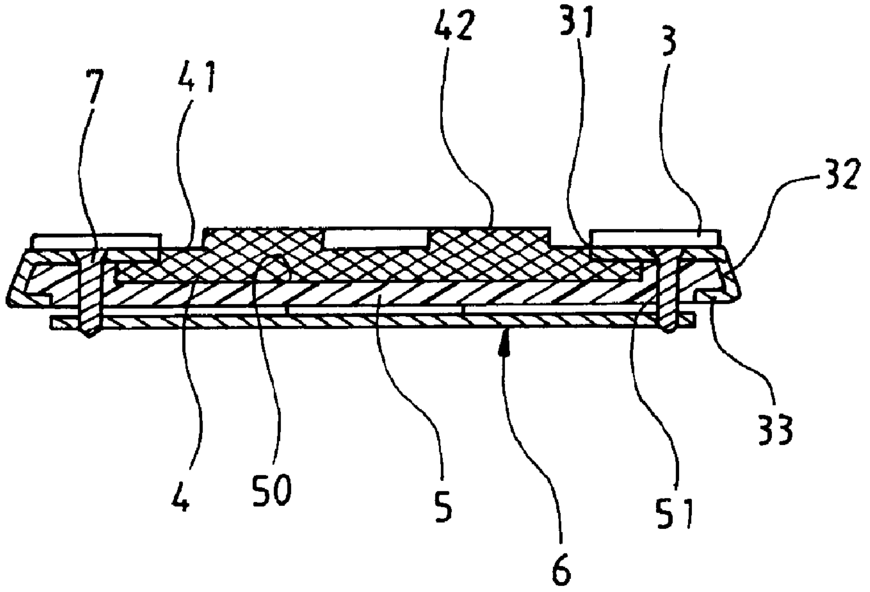
FIG. 6 is a cross-sectional view of the automobile pedal in accordance with the present invention.

Referring to FIG. 6, after being assembled, the embedded member 4 is mounted to the frame member 3 by having the raised portion 41 thereof fit into the opening 31 of the frame member 3 and the lower portion of the embedded member 4 is stacked on the base board 5. Bolts and screws are then fit through the mounting holes 32, 51 and engage the mounting structure 6 to secure the pedal to the mounting structure 6. When the pedal is worn out after a long while of service, or when it is desired to change for different decoration patterns, the pedal can be dismounted and separated to replace the embedded member 4 with a new or different one. In this way, there is no need to dispose of the whole pedal and consumption of the natural resources is reduced to effect conservation of environment. In addition, manufacturing costs can be reduced by only developing the embedded member 4 and molds therefor, while the remaining parts can be re-used in combination with different embedded member 4.

Figure 7:
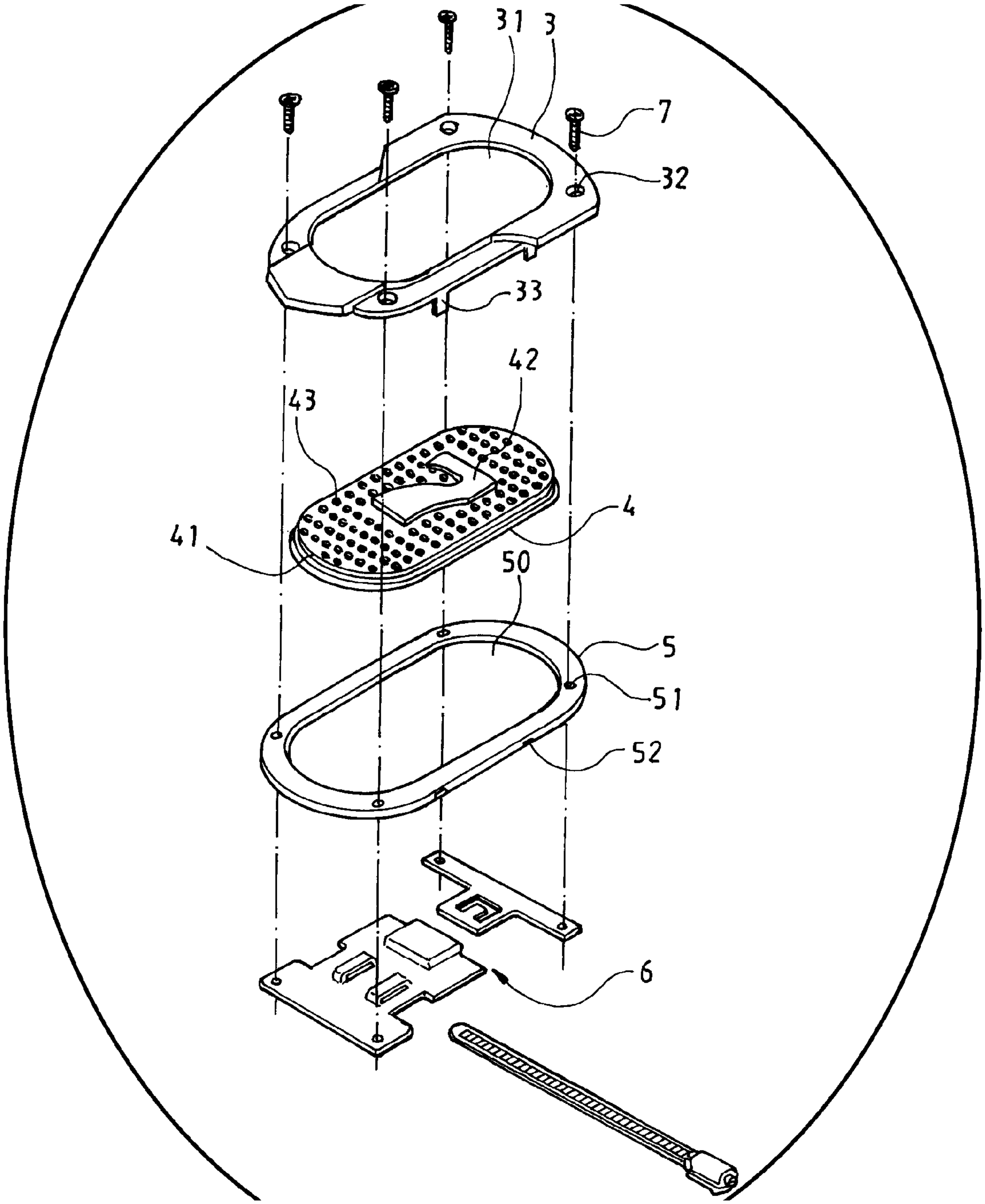
FIGS. 7 and 8 are exploded views of automobile pedals having different configurations in accordance with another embodiment of the present invention.
Figure 8:
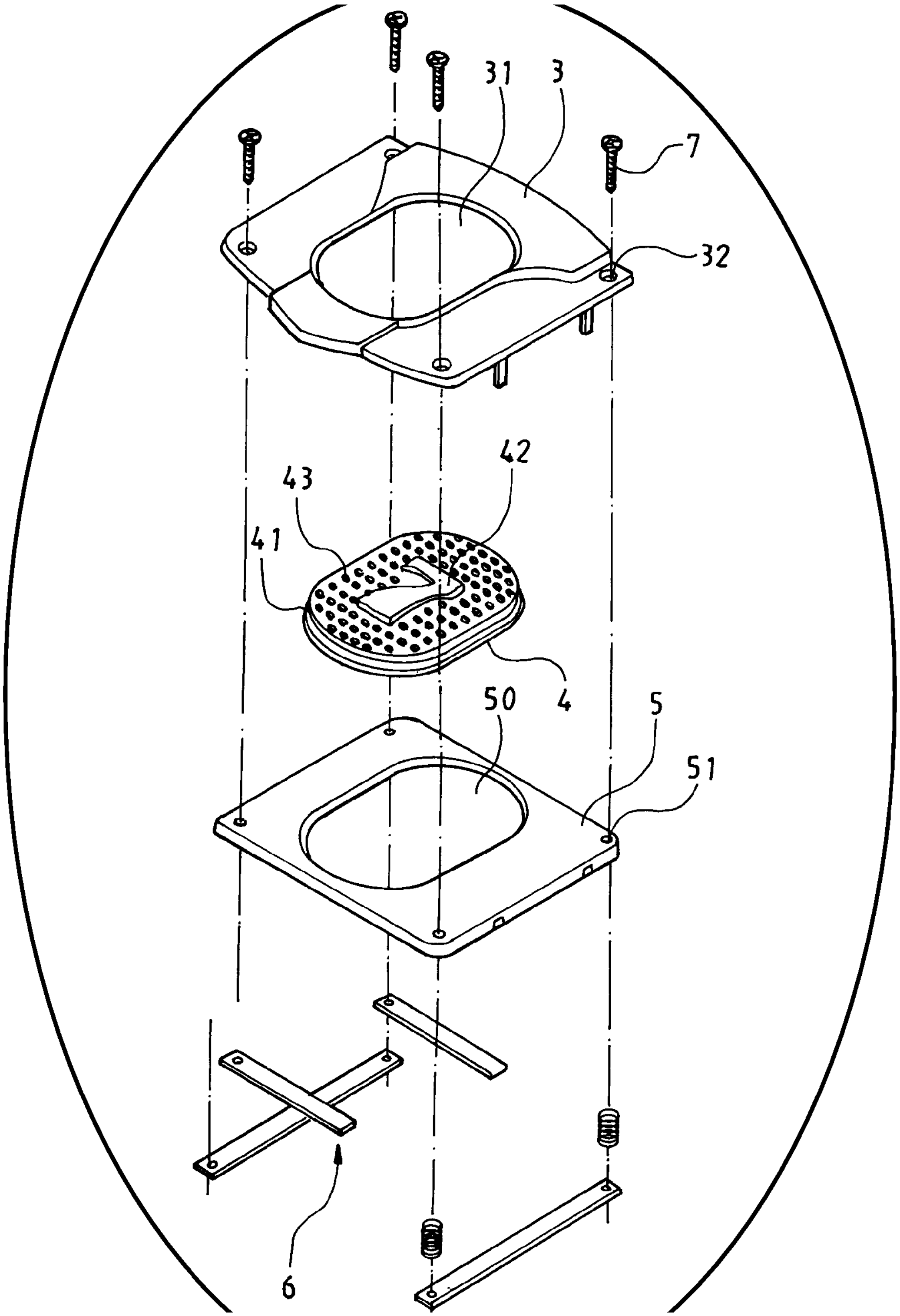

FIGS. 7 and 8 illustrate different embodiments of the embossed patterns 42 of the raised portion 41 of the embedded member 4. Apparent enough, the embossed patterns 42 can be of any desired patterns to provide different aesthetic appealing to the users. For example, the embossment of the embedded member 4 illustrated in FIGS. 7 and 8 comprises a single figure surrounded by a matrix-like arrangement of bosses 43. It is also obvious to those having ordinary skills to make the embedded member 4 with metal or other materials.

Although the present invention has been described with reference to the preferred embodiments thereof, it is apparent to those skilled in the art that a variety of modifications and changes may be made without departing from the scope of the present invention which is intended to be defined by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An automobile pedal comprising:

a frame member forming an opening surrounded by a circumferential wall in which first mounting holes are formed;

an embedded member comprising a raised portion corresponding in shape and size to the opening of the frame member to be fit into the opening, the raised portion forming embossment and bosses around the embossment, the embossment comprising different patterns that are formed by micro injection molding so that the different portions are provided with different colors;

a base board arranged under the embedded member and defining a cavity substantially corresponding to and receiving the embedded member, the cavity being surrounded by a circumferential wall in which second mounting holes are defined; and a mounting structure;

wherein the frame member is attached to the base board to sandwich the embedded member therebetween to form an assembly that is secured to the mounting structure, the frame member comprises securing tabs formed on the circumferential wall thereof and extending in a direction substantially perpendicular to the frame member, the circumferential wall of the base board forms notches corresponding to and receivingly engaging the securing tabs to attach the frame member to the base board, thereby enabling the embedded member to be removed from the assembly to allow for replacement.

2. The automobile pedal as claimed in claim 1, wherein the embedded member is made of a flexible material.

* * * * *